(12) United States Patent
Saint-Hilaire et al.

(10) Patent No.: US 9,667,435 B2
(45) Date of Patent: May 30, 2017

(54) REMOTE AUDIO

(75) Inventors: Ylian Saint-Hilaire, Hillsboro, OR (US); Bryan Y. Roe, Camas, WA (US); Nelson F. Kidd, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 930 days.

(21) Appl. No.: 13/540,793

(22) Filed: Jul. 3, 2012

(65) Prior Publication Data
US 2013/0005324 A1 Jan. 3, 2013

Related U.S. Application Data

(60) Continuation of application No. 12/651,164, filed on Dec. 31, 2009, which is a continuation of application No. 12/574,193, filed on Oct. 6, 2009, which is a division of application No. 10/874,764, filed on Jun. 22, 2004, now Pat. No. 7,613,893.

(51) Int. Cl.
*H04L 12/28* (2006.01)
*H04L 29/08* (2006.01)

(52) U.S. Cl.
CPC ........ *H04L 12/282* (2013.01); *H04L 12/2803* (2013.01); *H04L 67/125* (2013.01); *H04L 67/16* (2013.01); *H04L 2012/285* (2013.01)

(58) Field of Classification Search
CPC . H04L 12/282; H04L 12/2803; H04L 67/125; H04L 67/16; G06F 3/1454; G06F 9/4445
See application file for complete search history.

(56) References Cited

U.S. PATENT DOCUMENTS

| | | | |
|---|---|---|---|
| 5,043,723 A * | 8/1991 | Araki et al. | 340/12.28 |
| 5,719,622 A | 2/1998 | Conway | |
| 6,071,194 A | 6/2000 | Sanderson | |
| 6,263,503 B1 * | 7/2001 | Margulis | 725/81 |
| 6,434,403 B1 * | 8/2002 | Ausems et al. | 455/556.2 |
| 6,559,773 B1 | 5/2003 | Berry | |
| 7,523,399 B2 | 4/2009 | Britt | |
| 7,613,893 B2 | 11/2009 | Saint-Hilaire et al. | |
| 9,124,441 B2 | 9/2015 | Saint-Hilaire et al. | |

(Continued)

OTHER PUBLICATIONS

Digital Home White Paper, "Continental Automated Buildings Association Information Series", Jun. 2003, 14 pages.

(Continued)

*Primary Examiner* — Andrea Long
(74) *Attorney, Agent, or Firm* — Christopher K. Gagne

(57) ABSTRACT

Various embodiments for remote presentation of an interface of a computing device, such as a PC, are described herein. In particular, in various illustrated embodiments, a local device such as a Digital Media Adapter (DMA), mobile device, cellular telephone, etc. may be used to receive input from a remote control, where the local device provides human perceptible feedback, such as a sound, visual response, etc., responsive to use of the remote control. In some embodiments, the local device may contain a memory or cache for locally storing particular feedback data for human perceptible feedback. In various embodiments, a communication protocol is provided for storing, triggering, deleting, etc. feedback data in the memory cache. Other embodiments may be disclosed or claimed.

29 Claims, 5 Drawing Sheets

(56) References Cited

U.S. PATENT DOCUMENTS

| | | | |
|---|---|---|---|
| 9,178,712 | B2 | 11/2015 | Saint-Hilaire et al. |
| 2001/0053274 | A1 | 12/2001 | Roelofs |
| 2002/0013852 | A1 | 1/2002 | Janik |
| 2002/0040408 | A1 | 4/2002 | Choi |
| 2002/0062481 | A1 | 5/2002 | Slaney |
| 2002/0070873 | A1* | 6/2002 | Davies et al. ........... 340/825.22 |
| 2002/0104083 | A1 | 8/2002 | Hendricks et al. |
| 2002/0170063 | A1 | 11/2002 | Ansari |
| 2002/0180807 | A1* | 12/2002 | Dubil ................. H04N 5/44582 715/840 |
| 2003/0063608 | A1* | 4/2003 | Moonen .............. H04L 12/1836 370/390 |
| 2003/0067554 | A1 | 4/2003 | Klarfeld |
| 2003/0093792 | A1 | 5/2003 | Labeeb |
| 2003/0095211 | A1* | 5/2003 | Nakajima .............. G08C 19/28 348/734 |
| 2003/0097425 | A1 | 5/2003 | Chen |
| 2003/0154486 | A1 | 8/2003 | Dunn et al. |
| 2004/0075602 | A1 | 4/2004 | Griesau et al. |
| 2004/0213273 | A1 | 10/2004 | Ma |
| 2004/0268391 | A1 | 12/2004 | Clercq |
| 2005/0027539 | A1 | 2/2005 | Weber |
| 2005/0283731 | A1 | 12/2005 | Saint-Hilaire et al. |
| 2006/0072477 | A1 | 4/2006 | Bodlaender |
| 2008/0162716 | A1 | 7/2008 | Kayanuma et al. |
| 2010/0023869 | A1 | 1/2010 | Saint-Hilaire |
| 2010/0229099 | A1 | 9/2010 | Saint-Hilaire |

OTHER PUBLICATIONS

Final Office Action received for U.S. Appl. No. 12/574,193, mailed on Aug. 22, 2013, 21 pages.
Non-Final Office Action received for U.S. Appl. No. 12/574,193, mailed on Mar. 26, 2014, 18 pages.
Non-Final Office Action received for U.S. Appl. No. 12/574,193 mailed on Nov. 28, 2012, 15 pages.
Response to Final Office Action received for U.S. Appl. No. 12/574,193, filed Nov. 22, 2013, 22 pages.
Non-Final Office Action received for U.S. Appl. No. 12/651,164, mailed on Aug. 30, 2013, 14 pages.
Final Office Action received for U.S. Appl. No. 12/651,164, mailed on Mar. 26, 2014, 13 pages.
Final Office Action received for U.S. Appl. No. 12/651,164, mailed on Feb. 22, 2013, 13 pages.
Response to Final Office Action received for U.S. Appl. No. 12/651,164, filed Jul. 22, 2013, 17 pages.
Response to Non-Final Office Action received for U.S. Appl. No. 12/651,164, filed Dec. 2, 2013, 19 pages.
Response to Non-Final Office Action received for U.S. Appl. No. 12/651,164, filed Oct. 30, 2012, 9 pages.
Notice of Allowance received for U.S. Appl. No. 10/874,764, mailed on Jul. 9, 2009, 4 pages.
Office Action received for U.S. Appl. No. 10/874,764, mailed on Jan. 22, 2009, 7 pages.
Response to Office Action received for U.S. Appl. No. 10/874,764, filed Apr. 17, 2009, 9 pages.
Response to Office Action received for U.S. Appl. No. 10/874,764, filed Nov. 6, 2008, 10 pages.
Restriction Requirement received for U.S. Appl. No. 10/874,764, mailed on Oct. 22, 2008, 5 pages.
Restriction Requirement received for U.S. Appl. No. 10/874,764, mailed on Jan. 3, 2008, 5 pages.
Supplemental Notice of Allowance received for U.S. Appl. No. 10/874,764, mailed on Aug. 11, 2009, 3 pages.
Office Action received for U.S. Appl. No. 12/651,164, mailed on Jun. 27, 2012, 16 pages.
Notice of Allowance received in U.S. Appl. No. 12/574,193, dated Apr. 3, 2015 (7 pages).
Response to Final Office Action in U.S. Appl. No. 12/574,193, dated Mar. 16, 2015 (14 pages).
Final Office Action in U.S. Appl. No. 12/574,193, dated Dec. 15, 2015, and related PTO-1449 and PTO-892 documents (25 pages).
Response to Office Action in U.S. Appl. No. 12/574,193, dated Aug. 26, 2014 (16 pages).
Notice of Allowance received in U.S. Appl. No. 12/651,164, dated Jun. 5, 2015, and related PTO-1449 and PTO-892 documents (12 pages).
Response to Final Office Action in U.S. Appl. No. 12/651,164, dated Aug. 26, 2014 (15 pages).

* cited by examiner

REMOTE AUDIO

RELATED APPLICATIONS

This application is a continuation of prior co-pending U.S. patent application Ser. No. 12/651,164 filed Dec. 31, 2009 which is a continuation of U.S. patent application Ser. No. 12/574,193 filed Oct. 6, 2009, which is a division of U.S. patent application Ser. No. 10/874,764 filed Jun. 22, 2004.

FIELD OF THE INVENTION

An embodiment of the invention generally relates to remotely controlling delivery of human perceptible feedback, and more particularly to a local network device hosting a user interface for a remote network device, where the local device provides user interface feedback under direction of the remote device in response to interaction with the hosted user interface.

BACKGROUND

With the recent availability of ubiquitous network connections, and easily accessible digital devices, such as digital cameras, personal video recorders, MP3 audio players, HDTV displays, telephones and other communication devices, digital set-top boxes, new generations of mobile devices and media center PCs, and the like, it was realized a framework was required for manipulating and sharing the growing variety of digital media content consumers are acquiring for these devices. For example, if one has a home network including a stereo, computer display, and a networked camera or memory containing image data from the camera, one should be able to share easily music, photos, video, etc. on a variety of connected devices on a network.

But, to do so, a standard way of integrating these devices is required. Towards this end, in June 2003 Intel, Sony, and Microsoft founded the "Digital Home Working Group" (DHWG) to promote development of a common interoperability framework for digital devices. See, for example, Uniform Resource Locator (URL) http://developer-intel-com/technology/digitalhome and related linked documents. (Note, to prevent inadvertent hyperlinks herein, periods in the preceding URL were replaced with hyphens.) To further DHWG efforts, Intel Corporation has also put forth the Intel Networked Media Product Requirements (NMPR), a comprehensive set of requirements for network media interoperability at the protocol level.

The Intel NMPR describes a "capability stack" defining how network devices and/or consumer entertainment devices may be combined to deliver an end-user experience. NMPR provides a framework for managing issues such as user control, media formats, media transports, media distribution and control, device discovery and control, network data transfer, and the physical network. For more information regarding NMPR. One component of the NMPR is a "Digital Media Adapter" (DMA), also sometimes referred to as a "Digital Media Receiver" (DMR) or "digital home adapter." A DMA is a device that renders content sourced from another device. For example, a DMA may enable a personal computer (PC) on a network to distribute digital content such as photos, music, etc., or a user interface, to another networked device, such as a television, stereo, etc. The DMA is typically an inexpensive device proximate to a device to receive content.

With NMPR (or an equivalent) the DMA may be configured to allow a remote-capable application with a Universal Plug and Play (UPnP) Remote User Interface (also known as Remote I/O) client control point to setup and control a remote interface using (eXtended PC Remoting Technology) (XRT), a command encapsulation protocol for passing messages back and forth between two network devices (nodes). The commands encoded in the messages may include, for example, display drawing commands and user input commands. Hence, the commands in the messages may be used to locally present a user interface of a remote device, such as a graphical user interface of a remote PC on a television or other output device associated with the DMA. For more information about UPnP Remote User Interface, see URL http://www-intel-com/technology/itj/2002/volume06issue04/art03_remote_io/-p02_intro-htm, or see URL www-upnp-com. (Note, to prevent inadvertent hyperlinks, periods in the preceding URLs were replaced with hyphens.) Note also marks referenced herein are the property of their respective owners; in particular, the term UPnP is a trademark of The UPnP Implementers Corporation (UIC).

Unfortunately, while the XRT protocol (and related remoting techniques) allows a remote PC user interface to be displayed on a local output device such as a television, the XRT protocol does not provide for immediate real-time user feedback to let a user know a particular user action has been recognized by the remote PC. That is, while the XRT protocol does support the PC sending messages containing audio or other feedback to be presented on the television responsive to a user action, significant delays inherent to transferring the response data from the PC over the network, e.g., delays due to network congestion, poor wireless links, etc., may make the remote user interface appear sluggish or non-responsive.

BRIEF DESCRIPTION OF THE DRAWINGS

The features and advantages of the present invention will become apparent from the following detailed description of the present invention in which.

It should be appreciated by one skilled in the art that the drawings and accompanying description refer to exemplary embodiments.

DETAILED DESCRIPTION

In this detailed description and claims that follow, references to the "Digital Home Working Group" (DHWG), Intel Networked Media Product Requirements (NMPR), and "digital media adapter" (DMA) are intended to generally reference such technology possibilities, and are not intended to represent limitations to these or another particular technical environment. For example, while the DHWG contemplates a home network environment, it will be appreciated that the principles of the DHWG may be applied in other networking contexts. Similarly, references to a DMA are intended to refer to any machine that may assist with conveying or remotely presenting functionality of one device at a remote device. It is assumed herein the DMA utilizes the eXtended PC Remoting Technology) (XRT) command encapsulation protocol, however, it will be appreciated any equivalent protocol may be used. It should further be appreciated that the DMA may be a stand alone device, or it may be integrated within some other audio and/or visual device, such as a set-top box for a television, a monitor, a high-definition TV (HDTV) (with or without tuner), etc.

Figure 1:
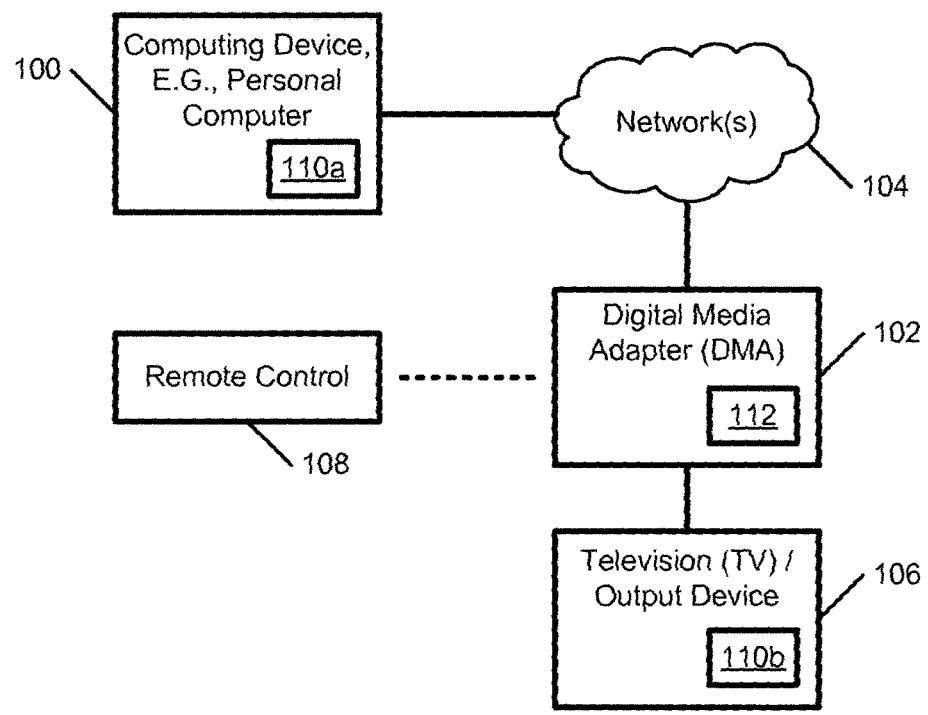
FIG. 1 illustrates a system of devices according to one embodiment.

FIG. 1 illustrates a system of devices according to one embodiment for utilizing a digital media adapter (DMA) to remotely present a user interface of a computing device 100 on a display. While the computing device may be any kind of computing device, such as a conventional personal computer (PC), to special purpose hardware, or even some combination of cooperatively operating machines, for simplicity the computing device will be referred to herein as a PC with the understanding that these and other device embodiments are contemplated.

The following discussion provides a general overview according to some embodiment possibilities; further detailed embodiments follow. The illustrated DMA 102, which in this embodiment is shown as a separate device, is communicatively coupled by way of some combination of wired and/or wireless communication pathways with the PC 100 by way of a network 104. For convenience, it is assumed the network 104 is a local area network (LAN), such as one found within a home environment. As will be discussed in further detail with respect to FIG. 6, the network may be an arbitrarily complex combination of various wired and/or wireless technology.

As illustrated, communicatively coupled with the DMA 102 is a display 106. The display may be any type of output technology with which one may access PC resources, including traditional devices such as monitors, projectors, and televisions, etc., as well as displays integrated into other devices, such as a portable or handheld device, including a notebook computer, personal digital assistant (PDA), cellular telephone, or the like. Hence, a PDA may "loan" out its display to a nearby DMA.

Also illustrated is a remote control 108 for interacting with the PC 100.

Although commands from the remote control may be sent directly to the PC, it is assumed the remote control is in communication with the DMA or other device in its immediate locale. Assuming the PC has a user interface 110a to be shown to a user, then display 106 shows a corresponding user interface 110b. For clarity, even though the DMA 102 and display 106 are depicted as separate devices, the corresponding user interface 110b will be referenced hereafter as the "DMA user interface" 110b to distinguish over the PC user interface 110a. The remote control may be used to apparently interact with the DMA and user interface 110b. However, transparently, commands performed on the remote control are in fact relayed to the PC 100 so that it may evaluate and respond to the commands as needed, where these responses are relayed back to the DMA user interface.

Responsive to receiving a command, the PC may indicate, for example, that a human perceptible response be performed to signify a command has been recognized. For example, in one embodiment, when a button is pushed on the remote control, some feedback is given immediately, such as an audible noise, tactile movement, or visual feedback, e.g., a beep, click, glow, etc., so that the remote control user is aware that use of the remote control was recognized.

In the illustrated embodiment, the remote control 108 utilizes a packet-based short range wireless communication technology, such one in accord with one of the Institute of Electrical and Electronics Engineers (IEEE) 802.11 family of networking protocols. Unfortunately, wireless technology is not very robust, as it is at the mercy of environmental influences and interferences, which may result in frequent packet drops ("lost packets"). In harsh environments, many transmission attempts may have to be made before usage data from the remote control reaches the PC. Multiple transmission attempts unfortunately result in communication delays above and beyond delays already inherent to routing data to and from the PC 100 over the network 104. In a society accustomed to interacting with devices that immediately respond to actions, such delays would make the PC and/or DMA seem sluggish and/or unresponsive, a condition unacceptable to most consumers.

In one embodiment, to facilitate fast interactive audio feedback responsive to use of the remote control 108, while also minimizing communication and interference latencies, in various embodiments the DMA 102 is configured with a remotely configurable memory 114, or "feedback cache." This memory is used to store data used to generate feedback responsive to an action. For example, the feedback may be playing an audio clip, and hence the data is the audio data to be played. In order for use of the remote control use to appear to be working correctly, the DMA must respond very quickly, e.g., play the audio data very quickly, e.g., within a few milliseconds, after using the remote control.

Figure 2:
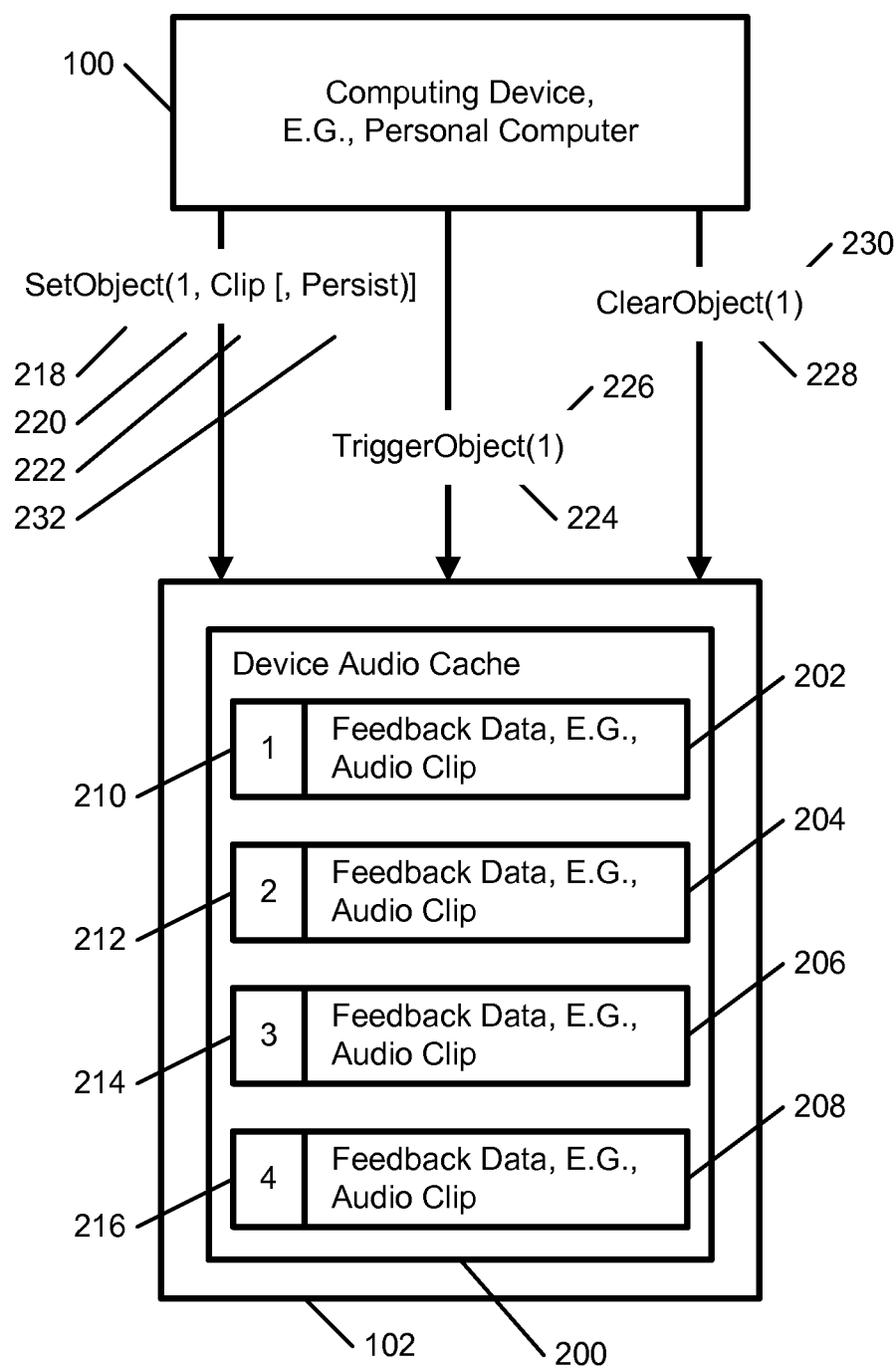
FIG. 2 illustrates a dataflow diagram according to one embodiment illustrative of communication between a FIG. 1 PC, DMA, and remote control.

FIG. 2 illustrates a dataflow diagram according to one embodiment illustrative of communication between PC 100, DMA 102, and remote control 108 of the FIG. 1. Assume we want to provide a click sound responsive to using the remote control. Current DMA devices require the PC to provide a constant stream of audio data to the DMA using a real time audio protocol, such as RTP (Real Time Protocol), e.g., when a remote control button is pressed, the PC sends an audio file recording of a "click" sound for playback by the DMA Unfortunately, as noted above, delays inherent to networking communication, and/or delays inherent to using wireless technology to communicatively couple network devices may result in unacceptable response times from the PC. That is, network congestion may result in the click being played late or out of sync with the button presses.

To minimize response delays, in the illustrated embodiment, the DMA contains at least one audio cache 200 for storing files for audio feedback. For illustrative purposes, four audio clips 202-208 are shown, however it will be appreciated data for other types of feedback may be stored. In one embodiment, the DMA audio cache 200 is stored within the FIG. 1 DMA memory 112. In another embodiment, the cache is maintained as a separate memory. In the illustrated embodiment, associated with each feedback clip is a clip identifier 210-216. The identifiers may be used by the PC, or presuming sufficient privileges, by another device, to refer to the stored audio clips 202-208.

The device audio cache 200 may contain pre-configured "stock" or "standard" sounds that are intended to be generally available. (It will be appreciated that globally unique identifiers (GUIDs) may be associated with stock sounds to allow cross-device recognition.) Or, the device may contain transitory sounds provided by another device. For example, as illustrated, the PC may provide the DMA with certain sound clips and instruct the DMA to store 218 them in the memory 112. In the illustrated embodiment, it is assumed the XRT protocol is used to communicate with the DMA and this protocol includes a SetObject command 218, having as parameters a clip identifier 220 and a clip 222, where the identifier parameter may be used to later refer to the clip 222. These parameter values correspond to the identifiers 210-216 and associated audio clips 202-208 illustrated in the Device Audio Cache 200 which would result from calling the SetObject command four times for each clip 202-208.

In one embodiment, to ensure the fastest possible response times, the clips 202-208 are stored as uncompressed sound clips, typically of a short duration, to avoid decompression delays. Once an audio clip (or other feedback) has been stored, the PC (or other controlling device) may issue a "remoting" command to the DMA to activate stored feedback data. In the illustrated embodiment, it is assumed the XRT protocol includes a TriggerObject command 224 taking as one or more parameters an identifier 226 or identifiers corresponding to identifiers 210-216 for clips 202-208 previously set by a SetObject command 218 or otherwise made available, e.g., such as identifiers for stock pre-loaded sounds. While the illustrated embodiment only shows one clip identifier 226 being triggered 224, it is contemplated that multiple clip identifiers may be provided to request multiple feedback data be activated simultaneously. Also, it will be appreciated the TriggerObject command may take additional parameters (not illustrated) to control how the feedback data is to be handled, e.g., for an audio clip, the TriggerObject command may identify a speed, quality, duration, etc. for the feedback.

In the illustrated embodiment, in accord with the SetObject command 218, there may also be a ClearObject command 228, having at least as a parameter a clip identifier 230 referring to a clip identifier 220 previously set with a SetObject command 218. This command may be used by a computing device, such as a PC, to manually remove feedback data from a device audio cache.

In one embodiment, the communication protocol between the PC 100 and DMA 102, e.g., the XRT protocol, requires the PC to register its use of the DMA, and to notify the DMA when such use is complete, e.g., when the PC logically disconnects from the DMA. In this embodiment, the DMA may be configured to clear its cache of stored feedback data, e.g., audio clips 202-208 stored in the Device Audio Cache 200, when it is notified the PC disconnects. It will be appreciated that other techniques may be utilized to notify the DMA when use is complete. For example, in an alternate embodiment, termination of an underlying TCP (Transmission Control Protocol) by either endpoint may signify end of use. In one embodiment, the SetObject command has an optional Persist 232 parameter to signify a set object is to remain cached even on disconnection of the device 100. It will be appreciated that various techniques (not illustrated) may be used to control clearing the cache, such as a usage counter tracking devices remaining connected to the DMA that have registered intent to use the cached data, a non-use timeout to track the last time a cached feedback was used, etc.

In a further embodiment (not illustrated), the DMA may announce to a computing device 100, its current stored feedback data, available cache storage space, etc. The announcement may be performed automatically on connection by the computing device, or responsive to a query command. The computing device, such as a PC, may then elect to connect to the DMA with instructions to the DMA regarding what cache entries, if any, the DMA should clear so that the computing device may utilize the cached data effectively, e.g., it may avoid caching data already present.

Figure 3:
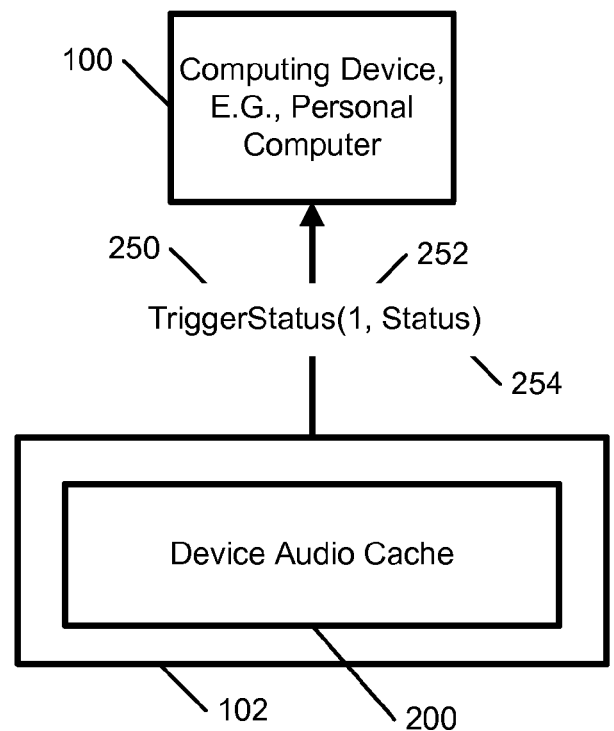
FIG. 3 illustrates a variation of FIG. 2 according to one embodiment.

FIG. 3 illustrates an embodiment in accord with the FIG. 2 embodiment, in which the DMA 102 may issue a "TriggerStatus" command 250 to a computing device 100, such as a PC, to indicate the status of a previous TriggerObject command 224.

This command may take several parameters, and as illustrated, the parameters at least include an identifier 252 to identify a previously triggered clip identifier, e.g., identifiers 210-216, and a status field 254 to convey a status back to the triggering machine, e.g., PC 100. While previously discussed embodiments may presume the feedback was a short audible clip such as a click noise to be played incident to pressing a remote control 108 button, it is not necessarily so. In this embodiment, a long clip may be played where the PC may wait (synchronously or asynchronously) for a certain status 254 to be received, such as a play-completion status indicator to indicate the DMA has completed playing triggered 224 feedback data.

Figure 4:
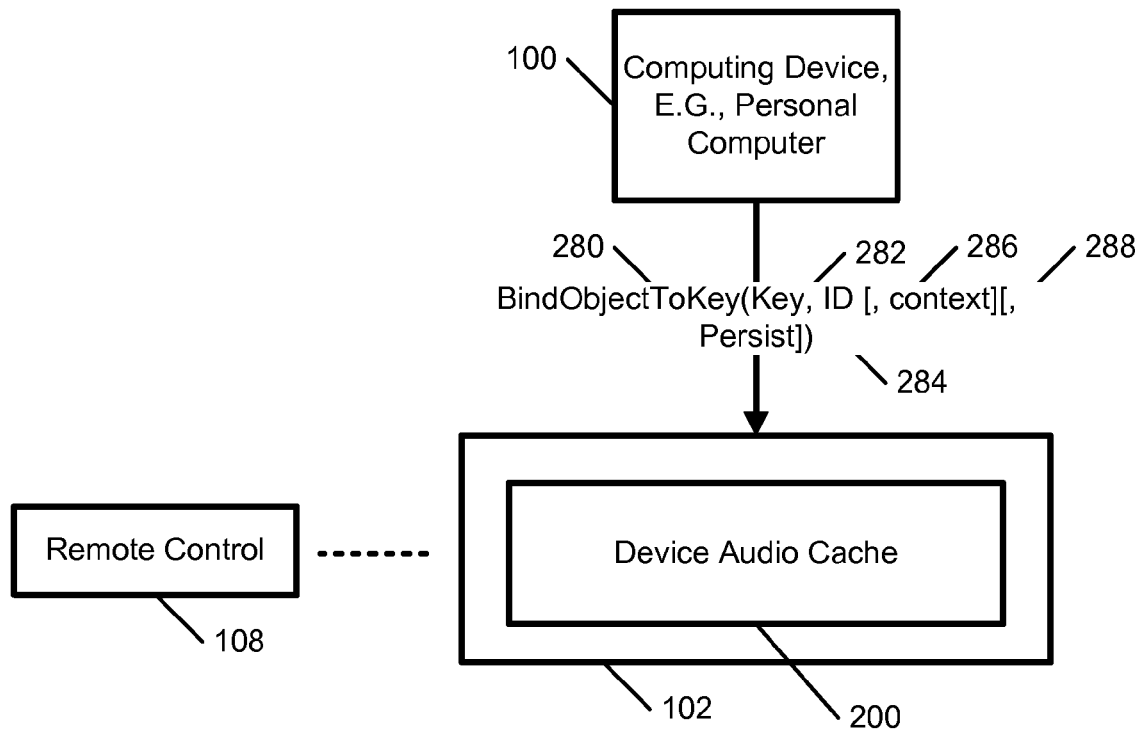
FIG. 4 illustrates another variation of FIG. 2 according to one embodiment.

FIG. 4 illustrates an embodiment in accord with the FIG. 2 embodiment, in which the PC 100 may issue a "BindObjetToKey" command 280 to associate, for example, a specific key or keys of a remote control 108 with a particular audio clip (or other feedback data) 202-208 stored in the Device Audio Cache 200.

This command may take several parameters, and as illustrated, the parameters at least include a key (or keys) identifier 282 to identify remote control key(s) to be bound, and a clip identifier 284 identifying a stored clip or other feedback data to be bound with the identified key(s). It will be appreciated multiple clips may be associated with multiple remote control keys, and it is simply for convenience that the illustrations only present a single key/clip association. In one embodiment, the command 280 may optionally include a context reference 286 identifying context(s) in which the key binding is active. That is, context may be provided to allow different feedback to be associated with different activities being performed by the DMA.

Use of the BindObjectToKey command 280 allows removing need for communication between the DMA 102 and a computing device 100 for each key press on the remote control 108. That is, in the illustrated embodiment, rather than a conventional round-trip operation in which one monitors for a key press, the computing device, for example a PC, is notified of the key press, and the computing device then triggers appropriate feedback, in the FIG. 4 embodiment, the computing device may simply bind desired feedback to a remote control 108 key(s). Hence, a key press results in the DMA immediately providing the desired appropriate feedback, such as playing an audio clip, as indicated in the binding 280.

It will be appreciated that while pre-configured "stock" or "standard" sounds are intended to remain available in the DMA 102 device audio cache 200, on disconnection of the device 100 from the DMA 100, the DMA is expected to clear its device audio cache 200 of sounds associated with the now disconnecting device 100, and to also remove any key 282 bindings performed by the device 100. However, this default action may not be desirable in all circumstances, for example, when the device 100 knows it will be reconnecting to the DMA 102, if there is a collection of devices sharing the same cached feedback data, etc. In such circumstances, similar to the Persist 224 optional parameter of FIG. 2, it may be desirable to include an optional Persist 288 parameter to the BindObjectToKey 280 command to signify the bound feedback key(s) 282 persist even on disconnection of the device 100. As discussed above, various techniques may be used to determine when to remove persistence.

Figure 5:
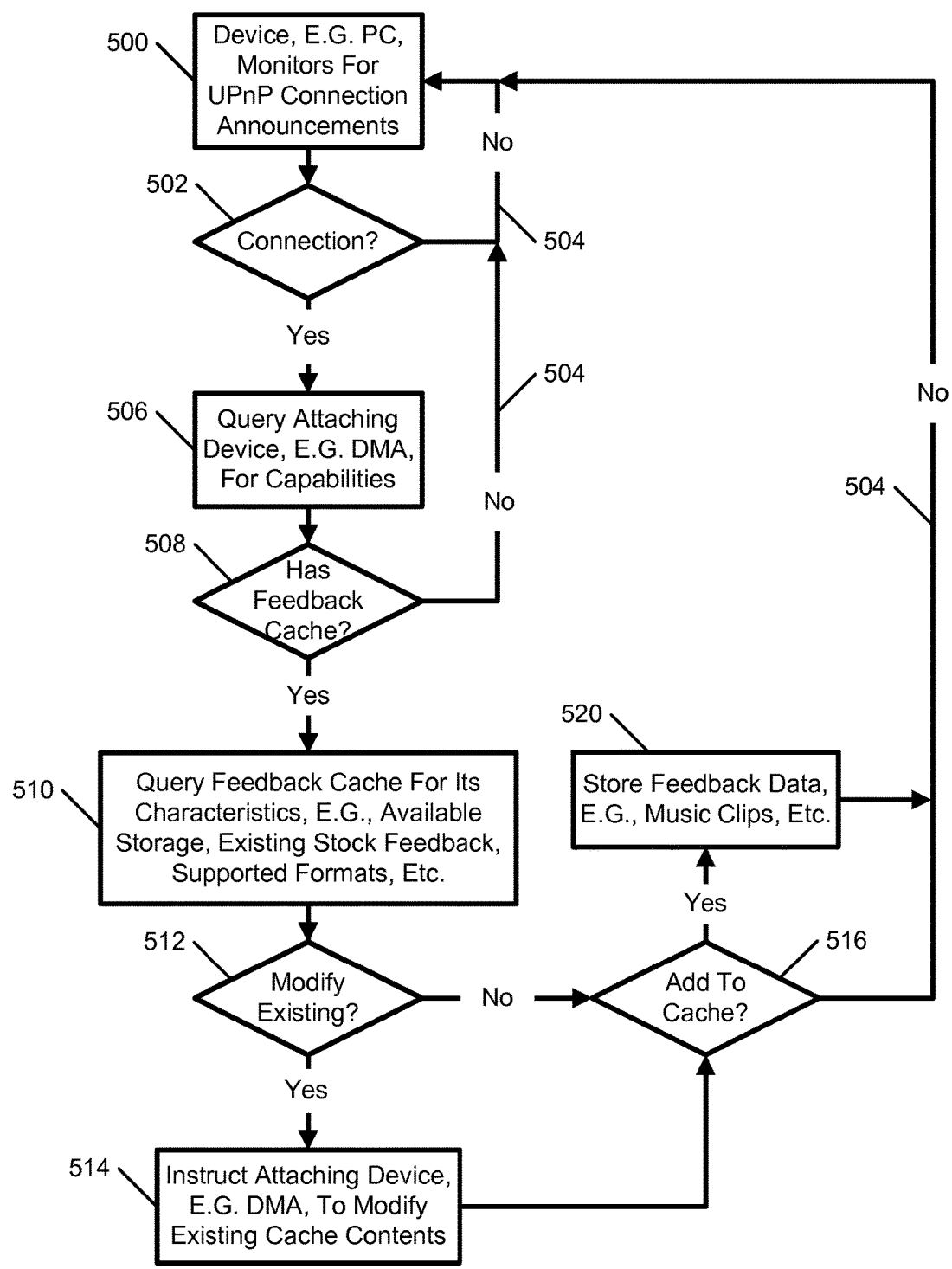
FIG. 5 illustrates a flowchart according to one embodiment for operating the FIG. 1 PC, DMA, and remote control in a UPnP environment.

FIG. 5 illustrates a flowchart according to one embodiment for operating the FIGS. 2-4 embodiments in a Universal Plug and Play (UPnP) environment.

It is assumed the reader appreciates that UPnP facilitates devices in a network environment to discover each other, and to control one another. UPnP is a product developed companies participating in the industry UPnP Forum, and generally comprises a set of protocols that allow devices on a network to automatically discover, control, and receive events from each other. The UPnP architecture offers pervasive peer-to-peer network connectivity of devices, such as PCs, of all form factors, as well as intelligent appliances, wireless devices, etc. It should also be appreciated, however, that UPnP is presented for expository convenience, and that other control and discovery efforts, such as "Jini" technology developed by Sun Microsystems, Inc., may also be used in the illustrated embodiments.

Assume the FIG. 1 computing device 100, e.g., a PC, and DMA 102 are UPnP aware devices, and that the PC is already attached to a network and monitoring 500 for connection announcements from other devices, such as the DMA, connecting to the network. It should be appreciated, however, the PC need not be required to pre-exist other devices, as the PC may later connect and then request all other UPnP devices to announce their presence and thus allow for the illustrated embodiment to take place. For example, in one embodiment, a UPnP multicast M-SEARCH command may be used. If 502 a connection is not seen, then processing loops 504. It will be appreciated that many operations, not illustrated, may occur in the looping back, such as responding to operations performed by a user interacting with a remote control for an already known UPnP device.

If 502 a connection is recognized, the monitoring 500 device, e.g., the PC 100, queries 506 the attaching device, e.g., the DMA 102, for its capabilities. If 508 the monitored device indicates it does not provide a feedback cache, then processing loops 504. However, if 508 the monitored device indicates it provides a feedback cache, then the monitoring device queries 510 the attaching device for its cache characteristics. It will be appreciated that requested characteristics are arbitrary, and may include by way of example only, a request for the attaching device's available cache storage, a listing of existing stock or "standard" feedback present in the device, supported data formats the attaching device is configured to, for example, play back, etc.

The monitoring device then determines if 512 it wants or needs to modify the existing cache contents. For example, the cache may already contain pre-cached content, such as data loaded by another network device, and available cache memory indicates the attaching device must clear some or all of its cache to handle the data the monitoring device wishes to store in the cache. In such a circumstance, the monitoring device may instruct 514 the DMA to modify its cache accordingly, such as by way of the FIG. 2 ClearObject command 228 to remove items from the cache. It will be appreciated that this is a simplified view on cache management, and the communication protocol with the DMA (or other device) may provide for complex cache operations, such as prioritizing cache deletion.

If 512 the monitoring device does not need to modify the existing cache contents, in the illustrated embodiment, the monitoring device then determines if 516 it wants or needs to add to the existing cache contents. If not, then processing loops back 504. If 512 the monitoring device does need to modify the existing cache contents, then the monitoring device instructs 520 the attaching device to store desired feedback data, such as music clips, etc., into the cache. Processing may then loop 504.

Figure 6:
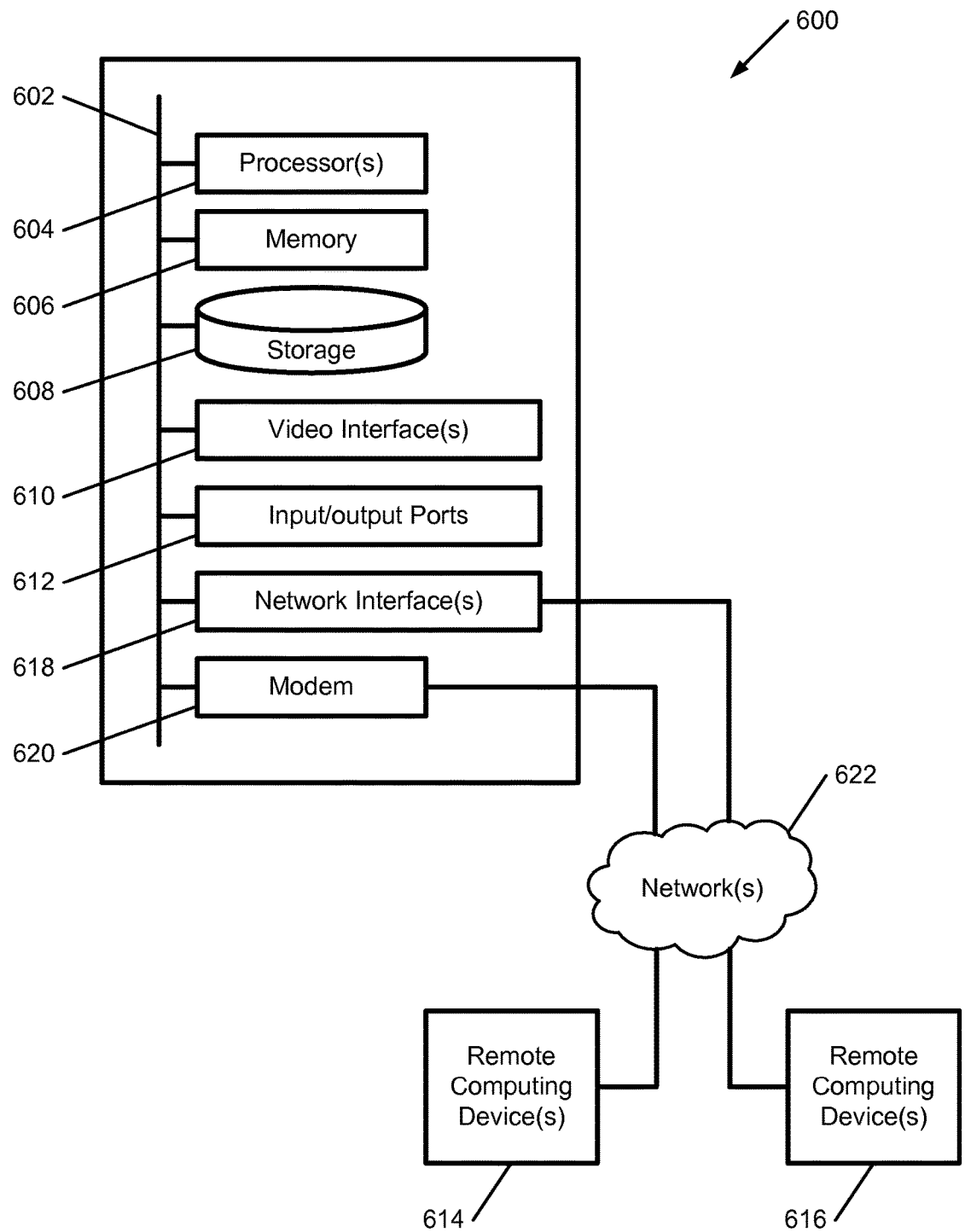
FIG. 6 illustrates a suitable computing environment in which certain aspects of the invention may be implemented.

FIG. 6 and the following discussion are intended to provide a brief, general description of a suitable environment in which certain aspects of the illustrated invention may be implemented. As used herein below, the term "machine" is intended to broadly encompass a single machine, or a system of communicatively coupled machines or devices operating together. Exemplary machines include computing devices such as personal computers, workstations, servers, portable computers, handheld devices, e.g., Personal Digital Assistant (PDA), telephone, tablets, etc., as well as transportation devices, such as private or public transportation, e.g., automobiles, trains, cabs, etc.

Typically, the environment includes a machine 600 that includes a system bus 602 to which is attached processors 604, a memory 606, e.g., random access memory (RAM), read-only memory (ROM), or other state preserving medium, storage devices 608, a video interface 610, and input/output interface ports 612. The machine may be controlled, at least in part, by input from conventional input devices, such as keyboards, mice, etc., as well as by directives received from another machine, interaction with a virtual reality (VR) environment, biometric feedback, or other input source or signal.

The machine may include embedded controllers, such as programmable or non-programmable logic devices or arrays, Application Specific Integrated Circuits, embedded computers, smart cards, and the like. The machine may utilize one or more connections to one or more remote machines 614, 616, such as through a network interface 618, modem 620, or other communicative coupling. Machines may be interconnected by way of a physical and/or logical network 622, such as the network 104 discussed for FIG. 1, an intranet, the Internet, local area networks, and wide area networks. One skilled in the art will appreciated that communication with network 622 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, volatile and/or non-volatile memory 606, or in storage devices 608 and their associated storage media, including hard-drives, floppy-disks, optical storage, tapes, flash memory, memory sticks, digital video disks, biological storage, etc. Associated data may be delivered over transmission environments, including network 622, in the form of packets, serial data, parallel data, propagated signals, etc., and may be used in a compressed or encrypted format. Associated data may be used in a distributed environment, and stored locally and/or remotely for access by single or multi-processor machines.

Thus, for example, with respect to the illustrated embodiments, assuming machine 600 embodies the computing device 100 of FIG. 1, then remote machines 614, 616 may respectively be the DMA 100 for FIG. 1 and another DMA, for example, present in another location. Thus, for example, it should be appreciated that one or more computing devices, such as machine 600, may operate in conjunction with one or more remote machines. It should be further appreciated that remote machines 614, 616 may be configured like machine 600, and therefore include many or all of the elements discussed for machine.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method comprising:
using a remote control to remotely control a first computing device, the remote control also being capable of issuing at least one command to a second computing device, the remote control being responsive to user input to control a first user interface that is capable of being displayed by the first computing device using a television display remotely from the second computing device, the user input also to be used in controlling the first computing device, the first user interface being a remote presentation of a second user interface to be displayed by the second computing device, the second computing device being a portable computing device capable of providing via wireless local area network communication a clip to be played using the first computing device in response to the at least one command, the remote control being capable of providing tactile feedback in response to at least certain of the user input;
wherein:
the first computing device and/or the second computing device comprises at least one handheld tablet computing device;
the first user interface, as displayed by the first computing device using the television display, corresponds to the second user interface that is to be displayed by the second computing device;
the first computing device and/or the second computing device is capable of being automatically wirelessly discovered and controlled, at least in part, via an automatic discovery protocol;
the first computing device comprises cache memory to store multiple portions of data to be provided from the second computing device, the multiple of portions of data to be used to permit, at least in part, multiple different user feedback responses to be provided in response, at least in part, to different user inputs received via the remote control, the multiple different feedback responses being capable of comprising tactile feedback response, video feedback response, and/or audio feedback response;
in response, at least in part, to at least one other command:
the multiple different feedback responses are to be associated with the different user inputs by the first computing device; and
the first computing device is to store in the cache memory the multiple portions of data;
in response, at least in part, to at least one further command, the multiple portions of data are to be cleared, at least in part, from the cache memory.

2. The method of claim 1, wherein:
the remote control communicates via packet-based wireless communication.

3. The method of claim 1, wherein:
the clip is an audio clip.

4. The method of claim 3, wherein:
the wireless communication is in a home environment.

5. An apparatus comprising:
a remote control to remotely control a first computing device, the remote control also being capable of issuing at least one command to a second computing device, the remote control to be responsive to user input to control a first user interface that is capable of being displayed by the first computing device using a television display remotely from the second computing device, the user input also to be used in controlling the first computing device, the first user interface being a remote presentation of a second user interface to be displayed by the second computing device, the second computing device being a portable computing device capable of providing a clip that is to be played using the first computing device in response to the at least one command, the remote control being capable of providing tactile feedback in response to at least certain of the user input;
wherein:
the first computing device and/or the second computing device comprises at least one handheld tablet computing device;
the first user interface, as displayed by the first computing device using the television display, corresponds to the second user interface that is to be displayed by the second computing device;
the first computing device and/or the second computing device is capable of being automatically wirelessly discovered and controlled, at least in part, via an automatic discovery protocol;
the first computing device comprises cache memory to store multiple portions of data to be provided from the second computing device, the multiple of portions of data to be used to permit, at least in part, multiple different user feedback responses to be provided in response, at least in part, to different user inputs received via the remote control, the multiple different feedback responses being capable of comprising tactile feedback response, video feedback response, and/or audio feedback response;
in response, at least in part, to at least one other command:
the multiple different feedback responses are to be associated with the different user inputs by the first computing device; and
the first computing device is to store in the cache memory the multiple portions of data;
in response, at least in part, to at least one further command, the multiple portions of data are to be cleared, at least in part, from the cache memory.

6. The apparatus of claim 5, wherein:
the remote control is to communicate via packet-based wireless communication.

7. The apparatus of claim 5, wherein:
the clip is an audio clip.

8. The apparatus of claim 7, wherein:
the wireless communication is in a home environment.

9. Non-transitory machine-accessible memory that includes data that when accessed by a machine results in the machine performing operations comprising:
remotely controlling, at least in part, using a remote control, a first computing device, the remote control being capable of issuing at least one command to a second computing device, the remote control being responsive to user input to control a first user interface that is capable of being displayed by the first computing device using a television display remotely from the second computing device, the user input also to be used in controlling the first computing device, the first user interface being a remote presentation of a second user interface to be displayed by the second computing device, the second computing device being a portable computing device capable of providing via wireless local area network communication a clip to be played using the first computing device in response to the at least one command, the remote control being capable of providing tactile feedback in response to at least certain of the user input;
wherein:
the first computing device and/or the second computing device comprises at least one handheld tablet computing device;
the first user interface, as displayed by the first computing device using the television display, corresponds to the second user interface that is to be displayed by the second computing device;
the first computing device and/or the second computing device is capable of being automatically wirelessly discovered and controlled, at least in part, via an automatic discovery protocol;
the first computing device comprises cache memory to store multiple portions of data to be provided from the second computing device, the multiple of portions of data to be used to permit, at least in part, multiple different user feedback responses to be provided in response, at least in part, to different user inputs received via the remote control, the multiple different feedback responses being capable of comprising tactile feedback response, video feedback response, and/or audio feedback response;
in response, at least in part, to at least one other command:
the multiple different feedback responses are to be associated with the different user inputs by the first computing device; and
the first computing device is to store in the cache memory the multiple portions of data;
in response, at least in part, to at least one further command, the multiple portions of data are to be cleared, at least in part, from the cache memory.

10. The memory of claim 9, wherein:
the remote control communicates via packet-based wireless communication.

11. The memory of claim 9, wherein:
the clip is an audio clip.

12. The memory of claim 11, wherein:
the wireless communication is in a home environment.

13. A method comprising:
providing, from a first computing device, in response to control from a remote control, a clip to be played, the remote control also being capable of issuing at least one command to a second computing device, the remote control being responsive to user input to control a first user interface that is capable of being displayed by the first computing device using a television display remotely from the second computing device, the user input also to be used in controlling the first computing device, the first user interface being a remote presentation of a second user interface to be displayed by the second computing device, the second computing device being a portable computing device capable of providing via wireless local area network communication the clip in response to the at least one command, the remote control being capable of providing tactile feedback in response to at least certain of the user input;
wherein:
the first computing device and/or the second computing device comprises at least one handheld tablet computing device;
the first user interface, as displayed by the first computing device using the television display, corresponds to the second user interface that is to be displayed by the second computing device;
the first computing device and/or the second computing device is capable of being automatically wirelessly discovered and controlled, at least in part, via an automatic discovery protocol;
the first computing device comprises cache memory to store multiple portions of data to be provided from the second computing device, the multiple of portions of data to be used to permit, at least in part, multiple different user feedback responses to be provided in response, at least in part, to different user inputs received via the remote control, the multiple different feedback responses being capable of comprising tactile feedback response, video feedback response, and/or audio feedback response;
in response, at least in part, to at least one other command:
the multiple different feedback responses are to be associated with the different user inputs by the first computing device; and
the first computing device is to store in the cache memory the multiple portions of data;
in response, at least in part, to at least one further command, the multiple portions of data are to be cleared, at least in part, from the cache memory.

14. The method of claim 13, wherein:
the remote control communicates via packet-based wireless communication.

15. The method of claim 13, wherein:
the clip is an audio clip.

16. The method of claim 15, wherein:
the wireless communication is in a home environment.

17. An apparatus comprising:
a first computing device to provide, in response to control from a remote control, a clip to be played, the remote control also being capable of issuing at least one command to a second computing device, the remote control to be responsive to user input to control a first user interface that is capable of being displayed by the first computing device using a television display remotely from the second computing device, the user input also to be used in controlling the first computing device, the first user interface being a remote presentation of a second user interface to be displayed by the second computing device, the second computing device being a portable computing device capable of providing via wireless local area network communication the clip in response to the at least one command, the remote control being capable of providing tactile feedback in response to at least certain of the user input;

wherein:
the first computing device and/or the second computing device comprises at least one handheld tablet computing device;
the first user interface, as displayed by the first computing device using the television display, corresponds to the second user interface that is to be displayed by the second computing device;
the first computing device and/or the second computing device is capable of being automatically wirelessly discovered and controlled, at least in part, via an automatic discovery protocol;
the first computing device comprises cache memory to store multiple portions of data to be provided from the second computing device, the multiple of portions of data to be used to permit, at least in part, multiple different user feedback responses to be provided in response, at least in part, to different user inputs received via the remote control, the multiple different feedback responses being capable of comprising tactile feedback response, video feedback response, and/or audio feedback response;
in response, at least in part, to at least one other command:
the multiple different feedback responses are to be associated with the different user inputs by the first computing device; and
the first computing device is to store in the cache memory the multiple portions of data;
in response, at least in part, to at least one further command, the multiple portions of data are to be cleared, at least in part, from the cache memory.

18. The apparatus of claim 17, wherein:
the remote control is to communicate via packet-based wireless communication.

19. The apparatus of claim 17, wherein:
the clip is an audio clip.

20. The apparatus of claim 19, wherein:
the wireless communication is in a home environment.

21. Non-transitory machine-accessible memory that includes data that when accessed by a machine results in the machine performing operations comprising:
providing, from a first computing device, in response to control from a remote control, a clip to be played, the remote control also being capable of issuing at least one command to a second computing device, the remote control being responsive to user input to control a first user interface that is capable of being displayed by the first computing device using a television display remotely from the second computing device, the user input also to be used in controlling the first computing device, the first user interface being a remote presentation of a second user interface to be displayed by the second computing device, the second computing device being a portable computing device capable of providing via wireless local area network communication the clip in response to the at least one command, the remote control being capable of providing tactile feedback in response to at least certain of the user input;

wherein:
the first computing device and/or the second computing device comprises at least one handheld tablet computing device;
the first user interface, as displayed by the first computing device using the television display, corresponds to the second user interface that is to be displayed by the second computing device;
the first computing device and/or the second computing device is capable of being automatically wirelessly discovered and controlled, at least in part, via an automatic discovery protocol;
the first computing device comprises cache memory to store multiple portions of data to be provided from the second computing device, the multiple of portions of data to be used to permit, at least in part, multiple different user feedback responses to be provided in response, at least in part, to different user inputs received via the remote control, the multiple different feedback responses being capable of comprising tactile feedback response, video feedback response, and/or audio feedback response;
in response, at least in part, to at least one other command:
the multiple different feedback responses are to be associated with the different user inputs by the first computing device; and
the first computing device is to store in the cache memory the multiple portions of data;
in response, at least in part, to at least one further command, the multiple portions of data are to be cleared, at least in part, from the cache memory.

22. The memory of claim 21, wherein:
the remote control communicates via packet-based wireless communication.

23. The memory of claim 21, wherein:
the clip is an audio clip.

24. The memory of claim 23, wherein:
the wireless communication is in a home environment.

25. The memory of claim 9, wherein:
the first computing device and/or the second computing device comprises at least one handheld telephone device.

26. The memory of claim 21, wherein:
the first computing device and/or the second computing device comprises at least one handheld telephone device.

27. An apparatus comprising:
a digital media processing device to provide, in response to control from a remote control, a video clip and/or audio clip to be played using a television, the remote control also being capable of issuing at least one command to a computing device, the remote control to be responsive to user input to control a first user interface that is capable of being displayed via the digital media processing device using the television remotely from the computing device, the user input also to be used in controlling the digital media processing device, the first user interface being a remote presentation of a second user interface to be displayed by the computing device, the computing device comprising at least one portable handheld tablet computing device capable of providing via wireless local area network communication the video clip and/or audio clip in response to the at least one command, the remote control being capable of providing tactile feedback in response to at least certain of the user input, the remote control also being capable of Bluetooth communication;

the digital media processing device comprising at least one processor, at least one network interface, at least one video interface, and flash memory to store instructions to be executed by the at least one processor;

wherein:
- the first user interface, as displayed by the digital media processing device using the television display, corresponds, at least in part, to the second user interface that is to be displayed by the computing device;
- the digital media processing device and/or the computing device is capable of being automatically wirelessly discovered and controlled, at least in part, via an automatic discovery protocol;
- the digital media processing device comprises cache memory to store, at least in part, multiple portions of data to be provided, at least in part, from the computing device, the multiple of portions of data to be used to permit, at least in part, multiple different user feedback responses to be provided in response, at least in part, to different user key inputs received via the remote control, the multiple different feedback responses being capable of comprising tactile feedback response, video feedback response, and/or audio feedback response;

in response, at least in part, to at least one other command:
- the multiple different feedback responses are to be associated with the different user key inputs by the digital media processing device; and
- the digital media processing device is to store in the cache memory the multiple portions of data;

in response, at least in part, to at least one further command, the multiple portions of data are to be cleared, at least in part, from the cache memory.

28. The apparatus of claim 27, wherein:
the multiple different feedback responses are to be provided in response, at least in part, to pressing of different keys of the remote control.

29. The apparatus of claim 27, wherein:
at least one of the multiple different feedback response comprises the tactile feedback response, the video feedback response, and the audio feedback response.

* * * * *